(12) United States Patent
Kumfer

(10) Patent No.: US 11,098,914 B2
(45) Date of Patent: Aug. 24, 2021

(54) SYSTEM AND METHOD FOR OPERATING A HVAC SYSTEM BY DETERMINING OCCUPIED STATE OF A STRUCTURE VIA IP ADDRESS

(71) Applicant: Carrier Corporation, Palm Beach Gardens, FL (US)

(72) Inventor: Brent Kumfer, Carmel, IN (US)

(73) Assignee: CARRIER CORPORATION, Palm Beach Gardens, FL (US)

(*) Notice: Subject to any disclaimer, the term of this patent is extended or adjusted under 35 U.S.C. 154(b) by 242 days.

(21) Appl. No.: 16/331,621

(22) PCT Filed: Sep. 8, 2017

(86) PCT No.: PCT/US2017/050797
§ 371 (c)(1),
(2) Date: Mar. 8, 2019

(87) PCT Pub. No.: WO2018/049244
PCT Pub. Date: Mar. 15, 2018

(65) Prior Publication Data
US 2019/0368756 A1 Dec. 5, 2019

Related U.S. Application Data

(60) Provisional application No. 62/385,816, filed on Sep. 9, 2016.

(51) Int. Cl.
*F24F 11/30* (2018.01)
*F24F 11/58* (2018.01)
(Continued)

(52) U.S. Cl.
CPC .............. *F24F 11/30* (2018.01); *F24F 11/58* (2018.01); *F24F 11/64* (2018.01);
(Continued)

(58) Field of Classification Search
CPC .. F24F 11/30; F24F 11/58; F24F 11/64; F24F 2120/10; F24F 2120/12; G05D 23/1917; H04L 12/2854
See application file for complete search history.

(56) References Cited

U.S. PATENT DOCUMENTS 7,469,550 B2   12/2008   Chapman, Jr. et al.
8,180,492 B2   5/2012    Steinberg
(Continued)

OTHER PUBLICATIONS

Hernandez, Grant et al., "Smart Nest Thermostat: A Smart Spy in Your Home", available at: https://www.blackhat.com/docs/us-14/materials/us-14-Jin-Smart-Nest-Thermostat-A-Smart-Spy-In-Your-Home-WP.pdf, accessed Mar. 6, 2019, 8 pages.
(Continued)

*Primary Examiner* — Marc E Norman
(74) *Attorney, Agent, or Firm* — Cantor Colburn LLP

(57) ABSTRACT

A system and method for operating an HVAC system based on the occupancy of a structure, wherein occupancy of the structure is determined by a remote occupancy identifier, the occupancy identifier configured to determine the occupancy of the structure by detecting if a user device is connected to a network within the structure, the occupancy identifier further configured to change at least one operational parameter setting of the HVAC controller depending on whether the structure is currently occupied or not.

17 Claims, 2 Drawing Sheets

(51) Int. Cl.
F24F 11/64 (2018.01)
G05D 23/19 (2006.01)
F24F 120/12 (2018.01)
H04L 12/28 (2006.01)

(52) U.S. Cl.
CPC ...... *G05D 23/1917* (2013.01); *F24F 2120/12* (2018.01); *H04L 12/2854* (2013.01)

(56) References Cited

U.S. PATENT DOCUMENTS

| | | | |
|---|---|---|---|
| 8,571,518 B2 | 10/2013 | Imes et al. | |
| 8,674,816 B2 | 3/2014 | Trundle et al. | |
| 9,247,378 B2 | 1/2016 | Bisson et al. | |
| 9,298,197 B2 | 3/2016 | Matsuoka et al. | |
| 2007/0114293 A1 | 5/2007 | Gugenheim | |
| 2011/0290893 A1* | 12/2011 | Steinberg | G05D 23/1951 236/49.3 |
| 2014/0031989 A1 | 1/2014 | Bergman et al. | |
| 2014/0031991 A1 | 1/2014 | Bergman et al. | |
| 2014/0316586 A1 | 10/2014 | Boesveld | |
| 2015/0148964 A1 | 5/2015 | Schultz et al. | |
| 2015/0159893 A1 | 6/2015 | Daubman et al. | |
| 2015/0188725 A1 | 7/2015 | Coles | |
| 2015/0338117 A1 | 11/2015 | Henneberger et al. | |
| 2015/0370272 A1 | 12/2015 | Reddy et al. | |
| 2019/0301763 A1* | 10/2019 | Hoffman | F24F 11/65 |

OTHER PUBLICATIONS

International Search Report and Written Opinion for application PCT/US2017/050797, dated Nov. 23, 2017, 10 pages.

Melfi, Ryan et al., "Measuring building occupancy using existing network infrastructure", Abstract, Conference: Green Computing Conference and Workshops (IGCC), 2011 International, 6 pages.

Smartisant, "Smart Home Occupancy & Presence", available at: https://smartisant.com/research/presence/index.php, accessed Mar. 6, 2019, 14 pages.

* cited by examiner

SYSTEM AND METHOD FOR OPERATING A HVAC SYSTEM BY DETERMINING OCCUPIED STATE OF A STRUCTURE VIA IP ADDRESS

CROSS-REFERENCE TO RELATED APPLICATION

The present application is an international patent application, which claims priority to U.S. Patent Application Ser. No. 62/385,816, filed Sep. 9, 2016, which is herein incorporated in its entirety.

TECHNICAL FIELD OF THE DISCLOSED EMBODIMENTS

The presently disclosed embodiments generally relate to heating, ventilation, and air-conditioning (HVAC) systems, and more particularly, to a system and method for operating a HVAC system by determining occupied state of a structure via IP address.

BACKGROUND OF THE DISCLOSED EMBODIMENTS

Programmable thermostats use several methods to save energy and money for the consumer. One method is by managing climate settings depending on the occupancy state of the structure (e.g. a home, or office building). For example, the temperature settings may be changed on a thermostat in an unoccupied structure so that energy is not used to operate the HVAC system unnecessarily. Similarly, a thermostat that operates an HVAC system only when the corresponding structure is occupied may be a more efficient system.

Determining the occupancy state of the structure is a problem when operating a thermostat based on occupancy. An ideal system requires an accurate and effective manner of identifying the occupancy state of the structure. If the occupancy state cannot be identified effectively, the system is not efficient (i.e. the system may incorrectly operate the HVAC system if it misidentifies whether the structure is occupied, or not).

Therefore, there is a need for an improved system and method for operating a HVAC system by determining occupied state of a structure.

SUMMARY OF THE DISCLOSED EMBODIMENTS

In one aspect, an HVAC system is provided. The system includes a first network comprising a wide area network (WAN) side, a second network in communication with the first network and located remote from the first network, an HVAC controller, and, an occupancy identifier remote from the first network, and configured to determine if an operational action is transmitted from within the first network, and transmit a command to the HVAC controller if it is determined the operational action is transmitted from within the first network, or from outside the first network.

In at least one embodiment, the occupancy identifier is configured to receive an operational action, the operational action being received when the user device connects to the first network, when the user device maintains connectivity to the first network, when the user device disconnects from the first network, and when the user device is operated to change the at least one operational parameter setting within the HVAC controller.

In an embodiment, a method for operating an HVAC system is provided. The method includes: receiving at the occupancy identifier the operational action comprising a user device identifier (i.e. a WAN IP address of the user device), comparing at the occupancy identifier, a HVAC controller identifier (i.e. a WAN IP address of the HVAC controller), and the user device identifier, to detect if the operational action is transmitted from within the first network in a structure, and operating the HVAC controller to execute the operational action if it is determined the HVAC controller identifier is identical to the user device identifier.

The method further includes the step of receiving the operational action when the user device connects to the first network, when the user device maintains connectivity to the first network, when the user device disconnects from the first network, and when the user device is operated to change the at least one operational parameter setting within the HVAC controller In an embodiment, the method further comprises operating an HVAC component to satisfy an interior environmental condition based in part on whether the operational action is transmitted from within the first network, or from outside the first network.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

Figure 1:
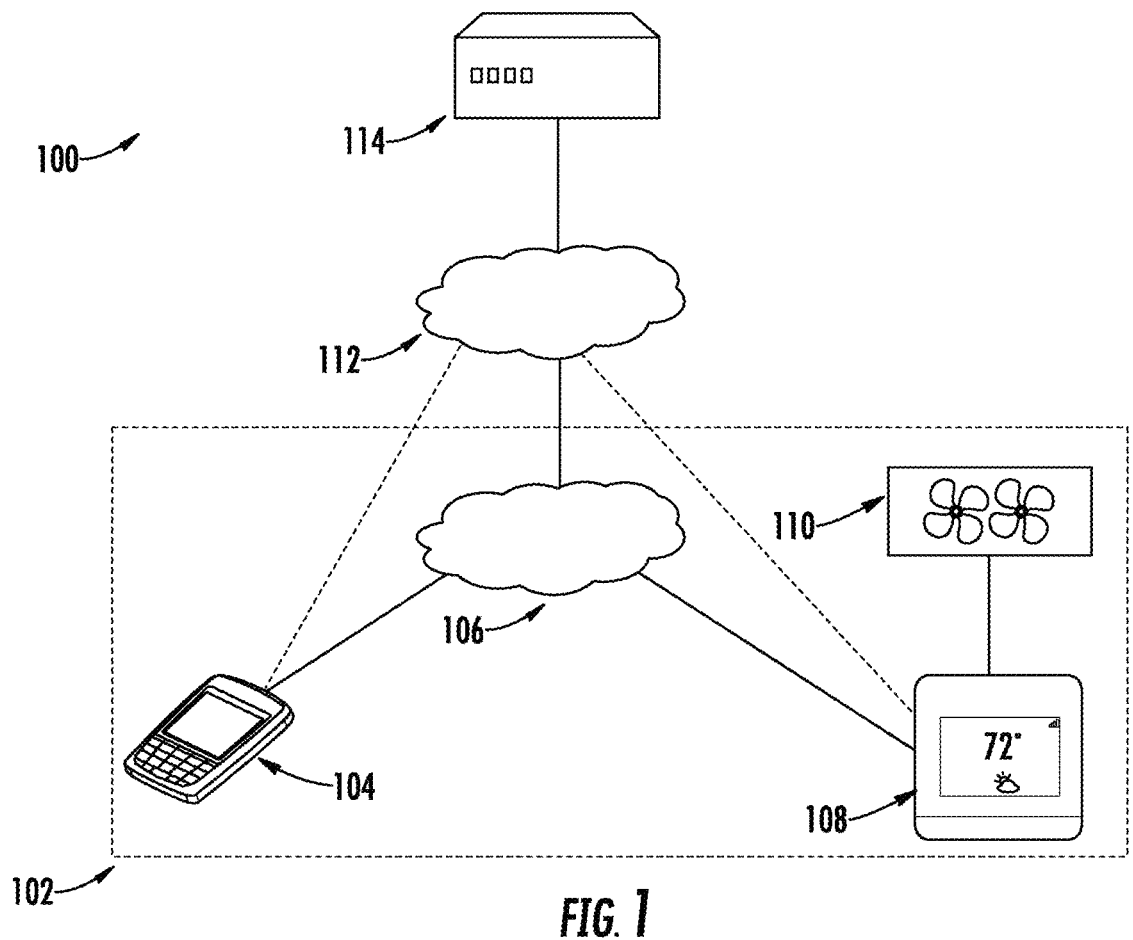
FIG. 1 is a schematic component diagram of a HVAC system.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 is a schematic view of an HVAC system 100. The HVAC system 100 includes a first network 106 comprising a wide area network (WAN) side, the first network 106 further configured to send and receive data between devices connected thereto; a second network 112 in communication with the first network 106, the second network 112 comprising a wide area network and located remote from the first network 106; an HVAC controller 108 in communication with at least one of the first network 106 and second network 112; and, an occupancy identifier 114 in communication with the second network 112, the occupancy identifier 114 located remote from the first network 106, and configured to determine if an operational action is transmitted from within the first network 106.

In at least one embodiment of the present disclosure, the first network 106 and second network 112 may include one of the different types of networks, such as, for example, intranet, local area network (LAN), wide area network (WAN), a metropolitan area network (MAN), a telephone network (such as the Public Switched Telephone Network), the internet, an optical fiber (or fiber optic)-based network, a cable television network, a satellite television network, or a combination of networks, and the like. The first network 106 and second network 112 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. It will be further appreciated that the first network 106 and second network 112 may include one or more data processing and/or data transfer devices, including routers, bridges, servers, computing devices, storage devices, a modem, a switch, a firewall, a network interface card (NIC), a hub, a bridge, a proxy server, an optical add-drop multiplexer (OADM), or some other type of device that processes and/or transfers data, as would be well known to one having ordinary skills in the art.

In at least one embodiment of the present disclosure, the second network 112 is remote, separate from, and operably connected to the first network 106. For example, the first network 106 may be a LAN within a structure 102, and the second network 112 may be a remote WAN. It will be appreciated that the first network 106 is operably connected to and recognized by the second network 112, such that any devices on the first network 106 can communicate with any devices on the second network 112, and vice versa. It will be further appreciated that the first network 106 may include a WAN side that may be associated with a WAN provided via second network 112. For example, if the first network 106 is considered the local (or "private") network, the second network 112 may be the Internet (or "public") network. Continuing with this example then, any devices on the first network 106 that are connecting to the second network 112 will be shown to have the same public/WAN IP address (i.e. a device identifier) from the WAN side (i.e. the second network 112). This may be accomplished via Network Address Translation (NAT), to name one non-limiting example. It will be further appreciated that only a single, unique device identifier IP address (i.e. the public/WAN IP address) is required to represent an entire group of devices on the first network 106 that are communication with the second network 112. In at least one embodiment, the first network 106 may use TCP/IP-based protocols, such as, Dynamic Host Configuration Protocol (DHCP), or Dynamic Host Configuration Protocol (DHCPv6), to name two non-limiting examples.

In at least one embodiment of the present disclosure, devices connected to the first network 106 may be connected via wired (e.g., coaxial cable, Telecommunications Industry Association category 5 ("cat 5") cable, etc.) or wireless connections (e.g., using network devices such as those available under the IEEE 802.11 wireless LAN standards) to form a LAN.

The HVAC system 100 further includes the occupancy identifier 114. In at least one embodiment, the occupancy identifier 114 is operably connected to and recognized by the second network 112, and located remote from the first network 106. The occupancy identifier 114 is configured to determine if an operational action is transmitted from within the first network 106, by checking the public/WAN IP address of the operational action. For example, if a device's WAN side public/WAN IP address is the same as that of the public/WAN IP address of the HVAC controller 108, it is determined that the device is on the same network as the HVAC controller 108.

It will be appreciated that the occupancy identifier 114 can communicate with any devices connected to the first network 106, via the device's WAN side public/WAN IP address. The occupancy identifier 114 is configured to store information generated by the HVAC system 100, such as, for example, the at least one operational parameter setting of the HVAC controller 108, the occupancy status of the structure 102, and the public/WAN IP address of the HVAC controller 108. In at least one embodiment of the present disclosure, the occupancy identifier 114 is a remote server or computing device, such as, for example, a software as a service (SaaS), or cloud based system. It will be appreciated by those of ordinary skill in the art that occupancy identifier 114 may further comprise a web service and/or application programming interface infrastructure, such software systems, hardware, and componentry as would occur to one of skill in the art, to operably perform the functions allocated to the occupancy identifier 114 in accordance with the present disclosure.

The occupancy identifier 114 is further configured to transmit a command to the HVAC controller 108, via at least one of the first network 106 and the second network 112, to change at least one operational parameter setting within the HVAC controller 108 if it is determined the operational action is transmitted from within the first network 106, or from outside the first network 106.

In at least one embodiment, the HVAC system 100 includes the HVAC controller 108. The HVAC controller 108 may include a computer, thermostat, indoor unit control board, outdoor unit control board, microprocessor, mobile device, etc. to name a few non-limiting examples. In one embodiment, the HVAC controller 108 includes a processor, a memory, for example read only memory (ROM) or electrically erasable programmable read only memory (EEPROM) to name two non-limiting examples, and at least one communication interface. The at least one communication interface is configured to allow access to a network, later described herein. In one embodiment, the at least one communication interface may be a wired or wireless connection. In one embodiment, the HVAC controller 108 further includes a device interface, a user interface, for example a liquid crystal display (LCD) to name one non-limiting example, and at least one sensor, for example a temperature sensor or humidity sensor to name a couple of non-limiting examples. The device interface is configured to control one or more devices in communication with the HVAC controller 108, wherein the communication may be via a wired or wireless connection.

The HVAC controller 108 is operably connected to and recognized by the first network 106 (e.g. HVAC controller 108 may be a member of the LAN formed by first network 106). It will be further appreciated that the HVAC controller 108 has been assigned a unique identifier that identifies HVAC controller 108 each and every time it is connected to the first network 106. It will be further appreciated that the HVAC controller 108 will have a public/WAN IP address associated with the WAN side (i.e. the second network 112).

The HVAC system 100 further includes the HVAC controller 108 in communication with at least one HVAC component 110. The at least one HVAC component 110 is configured to condition the air within a structure 102. For example, the at least one HVAC component 110 may include a furnace, fan coil, heat pump, geothermal heat pump, humidifier, dehumidifier, indoor air quality system, etc., to name a few non-limiting examples. It will be appreciated that structure 102 can be any building that uses an HVAC system, such as offices, homes, schools, to name a few non-limiting examples.

The HVAC system 100 further includes the HVAC controller 108 in communication with the second network 112 to enable remote access and/or control of the HVAC controller 108, for example, via occupancy identifier 114. In one embodiment, the HVAC controller 108 is in communication with the first network 106 via a wired or wireless connection. It will be appreciated that the HVAC controller 108 may also be in communication with the second network 112 via a wired or wireless connection.

In at least one embodiment of the present disclosure, the occupancy identifier 114 may be operably connected to a user device 104. The user device 104 may include a web browser; mobile application, socket or tunnel, or other network connected software such that communication with the web services infrastructure on occupancy identifier 114 is possible over the first network 106, and/or the second network 112.

In at least one embodiment of the present disclosure, the user device 104 includes one or more appliances (e.g. televisions, refrigerators), computers, home networking equipment, smartphones, tablets, wearable technology, computing devices, or systems of a type well known in the art, such as a mainframe computer, workstation, personal computer, laptop computer, hand-held computer, cellular telephone, MP3 player, or personal digital assistant. The user device 104 comprises such software, hardware, and componentry as would occur to one of skill in the art, such as, for example, one or more microprocessors, memory systems, input/output devices, device controllers, and the like. The user device 104 also includes one or more data entry means (not shown in FIG. 1) operable by users of the user device 104 for data entry, such as, for example, voice or audio control, a pointing device (such as a mouse), keyboard, touchscreen, microphone, voice recognition, and/or other data entry means known in the art. The user device 104 also includes a display means (not shown in FIG. 1) which may comprise various types of known displays such as liquid crystal diode displays, light emitting diode display, and the like upon which information may be display in a manner perceptible to the user. It will be appreciated that user device 104 may further comprise a Global Positioning System (GPS) transceiver and such software, hardware, and componentry as would occur to one of skill in the art, to operably perform the functions allocated to the user device 104 in accordance with the present disclosure.

In at least one embodiment of the present disclosure, the user device 104, and the HVAC controller 108, may be operably connected to and recognized by the first network 106. When operably connected to and recognized by the first network 106, the user device 104 and HVAC controller 108 are assigned a unique identifier (e.g. a private IP address) by the first network 106.

Figure 2:
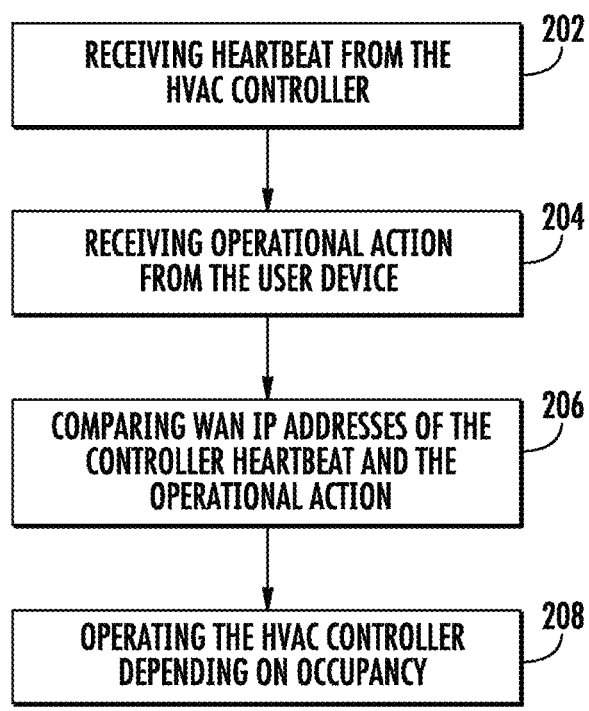
FIG. 2 is a schematic flow diagram of a method for operating a HVAC system by determining occupied state of a structure via IP address.

FIG. 2 illustrates a schematic flow diagram of an exemplary method 200, for operating an HVAC system 100. The method 200 includes receiving a heartbeat from the HVAC controller 108, at step 202; receiving an operational action from the user device 104, at step 204; comparing the public/WAN IP address of the heartbeat from the HVAC controller 108, and the public/WAN IP address of the operational action from the user device 104 to determine the occupancy of the structure 102, at step 206; and operating the HVAC controller 108 to execute the operational action depending on whether the structure 102 is currently occupied or not, at step 208.

In at least one embodiment of the present disclosure, the occupancy identifier 114 is configured to receive at least one heartbeat from the HVAC controller 108, at step 202. The occupancy identifier 114 may repeatedly receive the heartbeat from the HVAC controller 108 via the first network 106, or the second network 112. It will be appreciated that the heartbeat is a ping message from the HVAC controller 108. In at least one embodiment of the present disclosure, the heartbeat includes the public/WAN IP address of the HVAC controller 108. The heartbeat may further include an operational parameter setting of the HVAC controller 108, such as for example, a current temperature of the structure 102, a current humidity level of the structure 102, a current temperature set point, a humidity set point, a current operational status of HVAC component 110 (e.g. whether the HVAC component 110 is on or off), or any other HVAC operation information well-known to one having ordinary skills in the art.

In at least one embodiment of present disclosure, the occupancy identifier 114 is configured to repeatedly receive a heartbeat from the HVAC controller 108. In another embodiment, the occupancy identifier 114 can poll the HVAC controller 108 and request the transmission of a heartbeat. It will be appreciated that the occupancy identifier 114 may request the transmission of a heartbeat at periodic intervals, or during the occurrences of certain events, as further disclosed herein.

In at least one embodiment of the present disclosure, the occupancy identifier 114 receives an operational action from the user device 104, at step 204. For example, an occupant of the structure 102 may desire to operate the HVAC controller 108 when the occupant inhabits the structure 102. The occupant can operate his/her user device 104, such as, for example, a smartphone, to initiate an action with respect to the operational mode, temperature set point, or humidity set point for the HVAC component 110. Continuing with this example, a user may desire to increase the temperature of the interior space within structure 102 to 68° F. by operating in a heating mode or to decrease the temperature of the interior space within structure 102 to 75° F. by operating in a cooling mode. The user operates the user device 104 (i.e. the smartphone) to set such a temperature point. Upon such operation, the occupancy identifier 114 receives the operational action of setting a temperature point from the user device 104. It will be appreciated that the operational action received at the occupancy identifier 114 further includes a public/WAN IP address of the user device 104.

In at least one embodiment of the present disclosure, the occupancy identifier 114 receives an operational action each and every time the user device 104 accesses the first network 106. The operational action includes information that the user device 104 has accessed the first network 106. It will be appreciated that the operational action received at the occupancy identifier 114 further includes a public/WAN IP address of the user device 104.

In at least one embodiment of the present disclosure, the occupancy identifier 114 may receive an operational action each and every time the user device 104 leaves the first network 106. The operational action includes information that the user device 104 has left the first network 106. It will be appreciated that the operational action received at the occupancy identifier 114 further includes a public/WAN IP address of the user device 104.

In at least one embodiment of the present disclosure, the occupancy identifier 114 may be configured to receive an operational action periodically, and/or for as long as the user device 104 is operably connected to the first network 106. For example, the occupancy identifier 114 may periodically receive an operational action from the user device 104, indicative of the user device 104 being operably connected to the first network 106 (e.g. for as long as an occupant is within the structure 102). In such an embodiment, the operational action includes a ping message to the occupancy identifier 114. It will be further appreciated that any operational action received at the occupancy identifier 114 further includes a public/WAN IP address of the user device 104.

It will be appreciated that the occupancy identifier 114 may receive an operational action even without an occupant affirmatively operating the user device 104. Continuing with the example above, the occupancy identifier 114 may still receive operational actions from the user device 104, indicative of the user device 104 being operably connected to the first network 106, and therefore indicating to the occupancy identifier 114 that the structure 102 is occupied. Therefore, the occupancy identifier 114 may engage the HVAC controller 108 to continue to operate the HVAC component 110, and condition the climate within structure 102.

In at least one embodiment of the present disclosure, the occupancy identifier 114 may be configured to variably receive an operational action from the user device 104. For example, if structure 102 is typically occupied from 7 pm until 7 am and is then typically unoccupied from 7 am to 7 pm, the occupancy identifier 114 may be configured to receive an operational action more frequently around 7 am and 7 pm—the times most likely when the structure 102 transitions from an occupied state to an unoccupied state, and vice versa. Away from these time periods, the occupancy identifier 114 may reduce the receiving intervals of the operational actions to longer periods. It will be appreciated that the user device 104, or the occupancy identifier 114 can track and store the historical data of when the user device 104 accesses and leaves the first network 106. Using the information of when the user device 104 leaves or accesses the first network 106, the occupancy identifier 114 may identify periods of times during which it should increase receiving of operational actions. While somewhat simplistic examples are given for the sake of clarity, one skilled in the art would understand that complex patterns may be discovered and adjusted for.

In at least one embodiment of the present disclosure, the occupancy identifier 114 may be configured to receive operational actions from other systems within the structure 102, for example lighting, entertainment systems, and appliances to name a few non-limiting examples. It will be appreciated that the operation of these systems can cause an operational action to be received at the occupancy identifier 114. For example, if user device 104 includes a television set within the structure 102, when a user operates the television set, for example, by turning on the television set, the occupancy identifier 114 may receive an operational action from such television set, the operational action indicating that the television set has been turned on. It will be further appreciated that the operational action received at the occupancy identifier 114 includes a public/WAN IP address of the television set. In another example, if the user device 104 includes a coffee maker, the operation of the coffee maker (to make coffee) can cause the occupancy identifier 114 to receive an operational action indicative that the coffee maker has been operated, the operational action further including a public/WAN IP address of the coffee maker.

In at least one embodiment of the present disclosure, the occupancy of the structure 102 is determined, at step 206, by comparing at the occupancy identifier 114, the public/WAN IP address of the heartbeat from the HVAC controller 108, and the public/WAN IP address of the operational action from the user device 104. Continuing with the example above, when a user device 104 accesses the first network 106, it may be indicative that the user device 104 is within range, connected to and recognized by the first network 106. The public/WAN IP address of the heartbeat from the HVAC controller 108, and the public/WAN IP address of the operational action from the user device 104 will be the same, given that both the HVAC controller 108 and the user device 104 are operably connected to, and recognized by the first network 106. This may suggest that the user device 104 is within, or within close proximity to, structure 102, and that therefore, it is likely that the structure 102 is occupied, by the operator of the user device 104 ((i.e. the inhabitant of the structure 102).

In another example, when a user operates the user device 104 (e.g. a smartphone) to adjust a temperature set point within structure 102, the occupancy identifier 114 receives the operational action from the user device 104. The occupancy identifier 114 compares the public/WAN IP address of the heartbeat from the HVAC controller 108, and the public/WAN IP address of the operational action from the user device 104. Given that both the HVAC controller 108 and the user device 104 are operably connected to, and recognized by the first network 106, the occupancy identifier 114 determines that the operational action is transmitted from within the first network 106 in the structure 102, and may operate the HVAC controller 108 as further disclosed herein.

In at least one embodiment of the present disclosure, if the occupancy identifier 114 does not receive any operational action, the occupancy identifier 114 may determine that no operational actions are transmitted from within the first network 106, and that the structure 102 is unoccupied.

In at least one embodiment of the present disclosure, the occupancy identifier 114 may determine that the structure 102 is unoccupied each and every time user device 104 leaves the first network 106. When the user device 104 leaves the first network 106, the operational action includes a different public/WAN IP address. For example, if the user device 104 is a smartphone, the smartphone may use a cellphone-carrier based network (e.g. 4G LTE) to transmit the operational action. Continuing with this example, the operational action will include a different public/WAN IP than if the smartphone were connected to the first network 106. The occupancy identifier 114 then receives the operational action and determines that the public/WAN IP address of the heartbeat from the HVAC controller 108, and the public/WAN IP address of the operational action from the user device 104, are different. Given that the public/WAN IP addresses are different, this is indicative that the smartphone is not operably connected to the first network 106, and therefore, the structure 102 is likely not occupied. The occupancy identifier 114 may then operate the HVAC controller 108 as further disclosed herein.

In at least one embodiment of the present disclosure, the HVAC controller 108 is issued a command to execute the operational action depending on whether the structure 102 is currently occupied or not, at step 208. Continuing with a previous example, when a user device 104 accesses the first network 106, it may be indicative of occupancy of the user structure 102. The occupancy identifier 114 may then operate the HVAC controller 108 to satisfy a temperature condition. For example, if the operation mode of the HVAC system is set to 'Heat' at a temperature set point of 68° F., and the current temperature in the occupied structure 102 is 65° F., the occupancy identifier 114 will operate the HVAC controller 108 to use the HVAC component 110 until the temperature condition is satisfied within the occupied structure 102.

In at least one embodiment of the present disclosure, step 208 further includes operating the HVAC controller 108 to set an operational mode of the HVAC component 110. For example, the HVAC component 110 may need to cool structure 102, whereupon the operational mode of the HVAC component 110 may be set to 'Cool.' Similarly, the HVAC component 110 may need to heat structure 102, whereupon the operational mode of the HVAC component 110 may be set to 'Heat.' It will be appreciated that the operational mode of the HVAC component 110 may include features of a HVAC system well-known to one having ordinary skills in the art.

In at least one embodiment of the present disclosure, step 208 further includes operating the HVAC controller 108, to maintain operation of the HVAC component 110. For example, if the occupancy identifier 114 determines that the structure 102 is occupied (e.g. when the user device 104 maintains connectivity to the first network 106), the occupancy identifier 114 may maintain the operational mode of the HVAC component 110 (e.g. as 'On'), to ensure the HVAC component 110 continues to condition the air while the structure 102 is occupied. Conversely, if the user device 104 has not established connectivity to the first network 106, the occupancy identifier 114 may maintain the operational mode of the HVAC component 110 (e.g. as 'Off'), to ensure the HVAC component 110 is not operated when the structure 102 is not occupied.

In at least one embodiment of the present disclosure, step 208 further includes operating the HVAC controller 108, to disable the HVAC component 110. For example, if the occupancy identifier 114 determines that the structure 102 is unoccupied (e.g. when the user device 104 leaves the first network 106), the occupancy identifier 114 may change the operational mode of the HVAC component 110 to 'Off,' or adjust the temperature set point within the HVAC controller 108 to a more energy efficient setting, as will be well-known to one having ordinary skills in the art. It will be appreciated that the unoccupied structure 102 may not need to have the climate therein conditioned as perfectly, as when the structure 102 is occupied.

It will therefore be appreciated that the occupancy identifier 114 may receive an operational action from a user device 104, to determine the occupancy status of the structure 102, and operate the HVAC controller 108 based on the occupancy status of the structure 102.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. An HVAC system comprising:
a first network configured to send and receive data between devices connected thereto;
a second network in communication with the first network, the second network located remote from the first network;
an HVAC controller in communication with at least one of the first network and second network; and,
an occupancy identifier in communication with the second network, the occupancy identifier located remote from the first network, and configured to:
receive an HVAC controller identifier from the HVAC controller;
receive a user device identifier from a user device;
determine that a structure is occupied when the HVAC controller identifier is identical to the user device identifier, and
transmit a command to the HVAC controller, via at least one of the first network and the second network, to change at least one operational parameter setting within the HVAC controller when it is determined that the structure is occupied.

2. The HVAC system of claim 1, wherein the occupancy identifier is further configured to receive a heartbeat from the HVAC controller via at least one of the first network and the second network.

3. The HVAC system of claim 2, wherein the occupancy identifier receives the heartbeat at periodic intervals.

4. The HVAC system of claim 2, wherein the heartbeat comprises at least one of a HVAC controller identifier and the operational parameter setting.

5. The HVAC system of claim 4, wherein the occupancy identifier receives the operational action from a user device.

6. The HVAC system of claim 5, wherein the user device transmits the operational action via at least one of the first network and the second network.

7. The HVAC system of claim 5, wherein the operational action is received at periodic intervals.

8. The HVAC system of claim 5, wherein the operational action comprises at least one of the user device connects to the first network, the user device maintains connectivity with the first network, the user device disconnects from the first network, and the user device is operated to change the at least one operational parameter setting within the HVAC controller.

9. The HVAC system of claim 1, wherein the HVAC controller is operably connected to an HVAC component, the HVAC component configured to condition air within a structure.

10. The HVAC system of claim 1 wherein the HVAC controller identifier comprises a network IP address of the first network and the user device identifier comprises the network IP address of the first network when both the HVAC controller and the user device are connected to the first network.

11. A method for operating an HVAC system, the HVAC system comprising a first network, a second network, an HVAC controller, and an occupancy identifier communicatively coupled to one another, the method comprising:
receiving an operational action at the occupancy identifier via at least one of the first network and second network, the operational action comprising a user device identifier;
receiving a HVAC controller identifier at the occupancy identifier;
comparing, at the occupancy identifier, the HVAC controller identifier and the user device identifier, to determine whether the HVAC controller identifier is identical to the user device identifier; and
determining that a structure is occupied when the HVAC controller identifier is identical to the user device identifier;
transmitting a command to the HVAC controller, via at least one of the first network and the second network, to change at least one operational parameter setting within the HVAC controller when it is determined that the structure is occupied.

12. The method of claim 11, wherein the HVAC controller identifier comprises a HVAC controller WAN IP address.

13. The method of claim 11, wherein the operational action is received at periodic intervals.

14. The method of claim 11, wherein the operational action comprises at least one of the user device connects to the first network, the user device maintains connectivity with the first network, the user device disconnects from the first network, and the user device is operated to change at least one operational parameter setting within the HVAC controller.

15. The method of claim 11, wherein operating the HVAC controller further comprises operating an HVAC component to satisfy an interior environmental condition based in part on whether the operational action is transmitted from within the first network, or from outside the first network.

16. The method of claim 15, wherein the interior environmental condition comprises at least one of a temperature set point, a humidity set point, and an operational mode.

17. The method of claim 11, wherein the user device identifier comprises a user device WAN IP address.

* * * * *